United States Patent
Bottman et al.

(10) Patent No.: US 7,403,274 B2
(45) Date of Patent: Jul. 22, 2008

(54) EQUIVALENT TIME SAMPLING SYSTEM

(75) Inventors: Jeffrey S Bottman, Seattle, WA (US); William K Gessaman, Everett, WA (US)

(73) Assignee: Fluke Corporation, Everett, WA (US)

(*) Notice: Subject to any disclaimer, the term of this patent is extended or adjusted under 35 U.S.C. 154(b) by 0 days.

(21) Appl. No.: 11/462,996

(22) Filed: Aug. 7, 2006

(65) Prior Publication Data
US 2008/0013079 A1 Jan. 17, 2008

Related U.S. Application Data

(60) Provisional application No. 60/807,498, filed on Jul. 16, 2006.

(51) Int. Cl.
*G01N 21/00* (2006.01)
(52) U.S. Cl. ............................... 356/73.1
(58) Field of Classification Search ............... None
See application file for complete search history.

(56) References Cited

U.S. PATENT DOCUMENTS

| 6,594,004 B1 | 7/2003 | Makita |
| 7,173,443 B1* | 2/2007 | Asami .................... 324/765 |
| 2007/0066265 A1* | 3/2007 | May ........................ 455/307 |

* cited by examiner

*Primary Examiner*—Tu T Nguyen
(74) *Attorney, Agent, or Firm*—Richard A. Koske; James H. Walters

(57) ABSTRACT

An equivalent time sampling system employs two clock frequency sources, phase locked, wherein an analog to digital converter sampling clock is derived from one source and a pulse generator clock is derived from the other. Choice of the clock frequencies determines minimum time step and the set of available time steps, and pulse repetition period determines the time step size, for equivalent time sampling. The system is suitably implemented in a time domain reflectometer, optical time domain reflectometry system, or other systems for obtaining time domain responses to a periodic stimulus of a system under test, with stimulus rate and the sampling intervals varying over a wide range.

10 Claims, 5 Drawing Sheets

EQUIVALENT TIME SAMPLING SYSTEM

BACKGROUND OF THE INVENTION

This invention relates to test and measurement instruments, and more particularly to equivalent time sampling and, for example, to an optical time domain reflectometer (OTDR) that employs an improved equivalent time sampling system.

An OTDR is an optical fiber test instrument that launches light pulses into a fiber, then measures the back reflected light signals as a function of time. By examining the result, useful information such as location and loss of connectors and fiber length can be determined.

With reference to FIG. 1, a block diagram of an OTDR in accordance with the prior art, Some of the typical functional blocks in an OTDR include:

Laser diode light source 12, pulsed current source for laser 14, photodiode light receiver 16, fiber directional coupler amplifiers 20, analog to digital converter (ADC) 22, acquisition timing comprising a pulse trigger 24 and ADC clock 26, memory for trace acquisition 28, controller (Digital Signal Processor (DSP) 30, and user interface/display 32.

An OTDR must be able to generate time records over a wide range of record lengths and time steps, to accommodate various fiber lengths from very short, to very long, e.g., 100 kilometers, with trace time steps over 0.3125 ns to 40 ns. Time measurement records are built up over many pulse repetitions rather than a single pulse, for two reasons:

small time steps, less than 1.0 ns, are needed for short cables. Practical ADCs cannot sample that quickly in real time. For example, a typical ADC might have sampling period of 40 ns; and received signal levels are so small that many samples must be taken and averaged for each trace point, to increase the signal to noise ratio.

During each pulse rep, a subset of the required trace datapoints is acquired. All the different subsets that taken together comprise the trace record are acquired and stored in memory over a sequence of pulse repetitions numbering at least the following:

(ADC clock period)/(trace time step).

This process of acquiring and storing over a sequence of pulse repetitions is repeated if averaging is employed. For example, with (ADC clock period)=40 ns and (trace time step)=0.3125 ns, the required number of pulse repetitions is at least 40/0.3125=128. If 64 averages are needed, pulse repetitions=128*64=8,192.

When the resulting trace memory is properly ordered, the result is an equivalent time trace that is identical to what would be obtained in real time at the trace time step rate, or 3.2 GHz for the present example.

OTDR implementations in accordance with the prior art achieve fine time base resolution by using a sequential sampling interlacing scheme, where the ADC clock rate determines coarse sample intervals, and an analog adjustable time delay circuit preceding the pulse generator provides the fine intervals. Each pulse repetition employs a different delay setting to cover all the required trace points. However, in such an implementation, the delay circuit requires high speed, precision parts and also must be calibrated to account for component variations, and is subject to temperature induced inaccuracy. Such a prior art system typically includes a constant current source/capacitor ramp generator that connects to a high speed comparator. The other comparator input comes from a digital to analog converter (DAC). By varying the DAC setting with the digital signal processor 30, a variable delay between starting the ramp and triggering the comparator is obtained, to provide a delay of the actual trigger of the OTDR lasers.

Some drawbacks of the prior art scheme include:

the need to calibrate prior to an acquisition sequence to calibrate the variable delay generator, by determining the DAC values that correspond to the position of two successive A/D clock edges, using the "CAL status" as feedback indicating the relative position of the Delayed Trigger to the A/D clock edge;

the need to calculate DAC values to create the desired interlacing of samples in the equivalent time sampling system;

"finicky" high speed, precision analog hardware is required; and inaccuracies from second order effects.

Calculating DAC values to create the interlacing of samples is prone to some problems in that the delay is created using analog systems and thus subject to inaccuracies. Further, calibration requires moving the rising edge of the Delayed Trigger into the setup/hold region of a clocked digital part, which is prone to metastability which may lead to inaccurate calibration of the variable delay generator. Also, the laser pulse generator depends on the use of RC time constants to control the laser pulse widths. Individual component variations and inaccuracies result in variations between one device and the next when manufacturing devices.

It would be desirable to have an OTDR system that provided better step size precision, that did not need calibration adjustments and that was free from temperature drift.

SUMMARY OF THE INVENTION

In accordance with the invention, an OTDR employs two phase locked frequency sources, with one source clocking a stimulus pulse generator, and the other source setting the signal sampling rate. Equivalent time sampling is obtained thereby, with a wide range of pulse repetition rates and time steps.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises an optical time domain reflectometer employing an improved equivalent time sampling system.

The system is designed to have the pulse clock different enough from the sample clock so that over each pulse repetition, a different set of sample times are obtained. When these out-of-order samples are re-arranged, a complete pulse response record is obtained with the desired time step size. The acquisition sequence is continuous in the sense that the ADC is constantly clocked at the same rate, and pulses are generated every M pulse clock cycles, over the entire acquisition time, including repeats for averaging. Because the ADC is always being clocked at its maximum rate, the process is as time efficient as possible. Selection of sample and pulse frequencies is made in accordance with a discussion further below.

Figure 1:
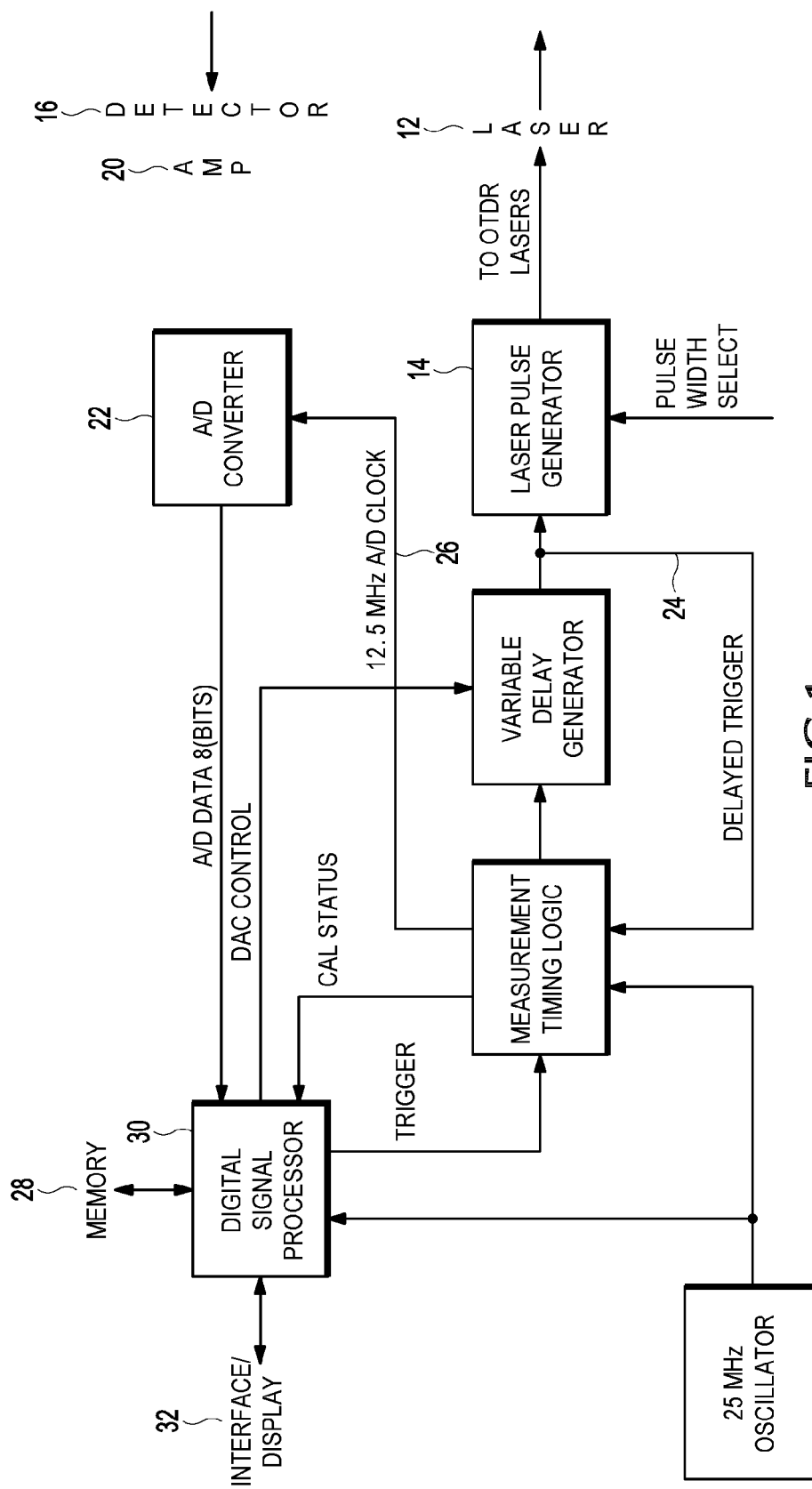
FIG. 1 is a block diagram of an OTDR in accordance with the prior art.
Figure 2:
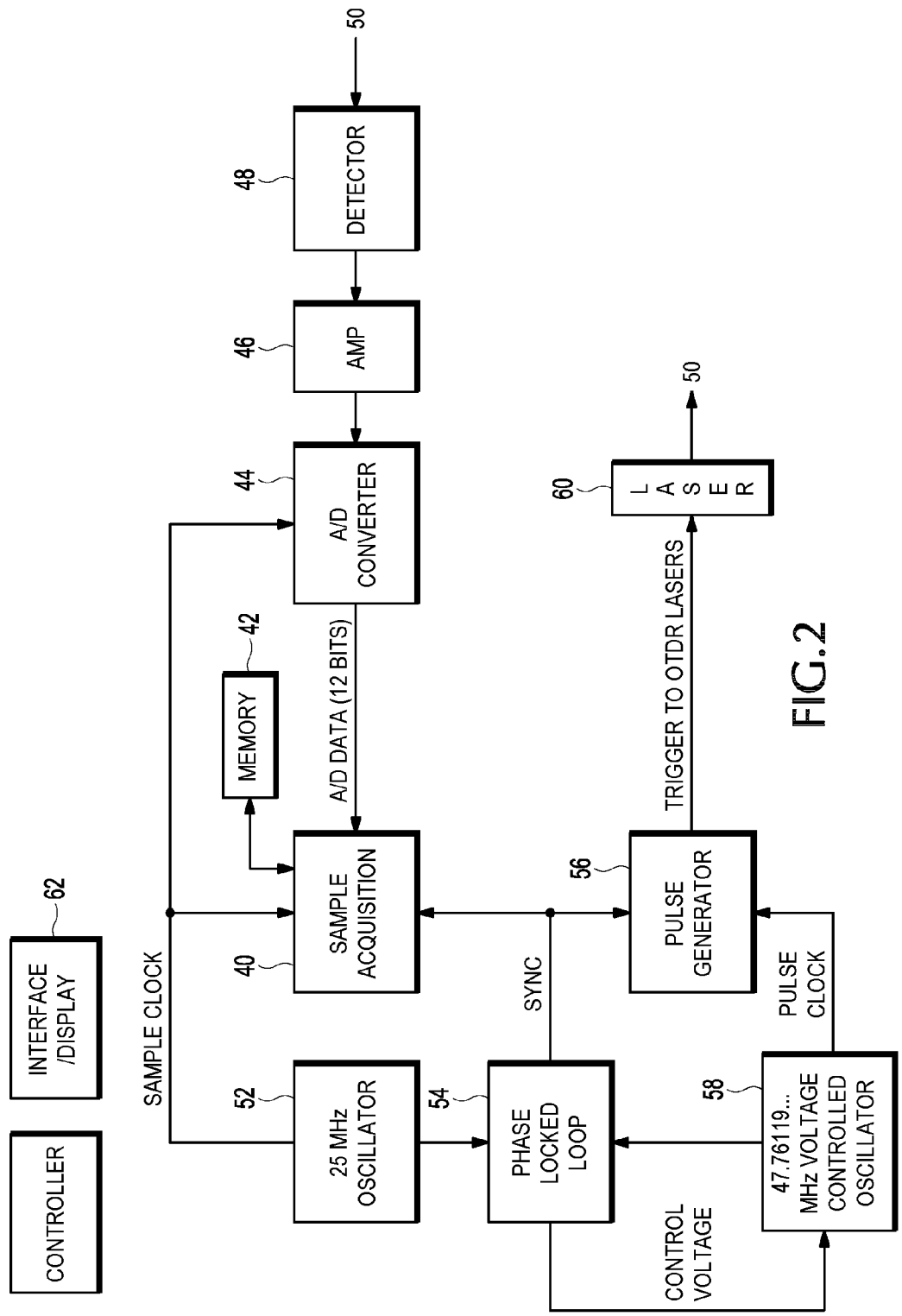
FIG. 2 is a block diagram of an OTDR in accordance with the present invention.

Referring to FIG. 2, a block diagram of an optical time domain reflectometer in accordance with the present invention, a sample acquisition controller block 40, interfaces with acquisition memory 42 and A/D converter 44. The A/D suitably provides 12 bit A/D data to the sample acquisition controller 40. A/D converter 44 receives analog signals via amplifier 46 from detector block 48, suitably photodiode detectors, which connect to the fiber optic network under test 50.

A sample clock 52, suitably 25 MHz, provides clocking to A/D converter 44, sample acquisition controller 40 and a phase locked loop (PLL) block 54. The PLL block supplies a SYNC signal to the sample acquisition controller 40 and to a pulse generator 56. PLL 54 also generates a control voltage signal supplied to a voltage controlled oscillator 58 (VCO), which supplies a pulse clock signal to the pulse generator 56. A trigger signal is generated by the pulse generator 56, supplied to laser block 60 which interfaces to output to the optical fiber network 50. A user interface/display block 62 is also provided to interact with the user for receiving operational commands and displaying results.

In operation, the PLL ensures that the pulse clock from VCO 58 to pulse generator 56 operates at a frequency of Sample Clock*128/67, which is nominally 47.76119 MHz in the illustrated embodiment, with the sample clock of 25 MHz. The SYNC signal from the PLL indicates when the two clocks are in phase and their rising edges are aligned. The sample acquisition controller block 40 and pulse generator block 56 use the SYNC signal to determine the ideal time to begin triggering a laser 60 and storing sample data from the A/D converter.

The frequencies of the sample and pulse may be chosen according to the following criteria.

First, the sample clock rate is chosen, which is the conversion rate for the ADC. This is generally desired to be as fast as practical, given the bit count needed and that the controller has to be able to accommodate that speed.

$T_s$=sampling period (ADC clock rate)

Next, choose the minimum desired time step size, which is the finest time step resolution available for the OTDR. It must be Ts divided by an integer Ns.

$$T_q = \frac{T_s}{N_s}$$

Ns=number of minimum steps, or quanta, per sample period

The set of divisors of Ns are the available choices of trace time steps, in units of minimum time step.

Example

If the sample clock is 25 MHz, and Ns=128, then:

$T_s$=40 ns=$N_s \times T_q$=128×(0.3125 ns)

The set of even divisors of 128, (available step sizes as multiples of minimum step), is:

1 2 4 8 16 32 64 128

This is the set of available trace time steps, in units of 0.3125 ns. Note that if desired, non-binary, more closely spaced time steps can be obtained by choosing a suitable Ns, such as the superabundant number 120. This number has divisors:

1 2 3 4 5 6 8 10 12 15 20 24 30 40 60 120

Next, we choose the pulse clock period. Like the sample clock period, the pulse clock period must be an integer number of minimum time steps:

$T_p = N_p \times T_q$

The pulse clock period and sample clock period, in units of minimum time steps, should have no common divisors other than 1, to obtain all the available time steps. This is always true if Np is prime, however primeness is not necessary.

$N_p$ and $N_s$ must have no common divisors

Continuing the example, with Ns=128, we can choose Np=67, since 67 is prime and shares no common factors with 128.

$T_p$=20.9375 ns=$N_p \times T_q$=67×(0.3125 ns)

$$\text{Pulse clock frequency} = \frac{1}{T_p} = 47.7612 \text{ MHz}$$

A particular time step size from the set of available values is obtained by appropriately choosing the pulse repetition period, which is an integer multiple of pulse clock periods.

PRP=$M \times T_p$ pulse repetition period

There are many values of M that yield a particular step size, and they must be chosen according to the following rule.

Step size is the greatest common divisor of number of pulse clocks and sample clock period, with step size and sample clock period in quanta units.

Expressed mathematically, the condition is:

$Q=gcd(M,N_s)$ number of time 'quanta' per trace time step

Continuing the example, if we want Tet=1.25 ns=trace time step, then with Tq=0.3125 ns, we need Q=4, and we must satisfy the equation:

$Q=4=gcd(M,128)$

Also suppose we have a minimum pulse repetition period of 1 us. This establishes a minimum value for M:

$$M > \text{fix}\left\{\frac{PRP}{T_p} = \frac{1 us}{20.9375 \text{ ns}}\right\} = 47$$

Now we increment from this minimum integer until the greatest common divisor condition mentioned above is satisfied, which in the example occurs at M=52, resulting in a pulse repetition period of 1.089 us.

In summary, we have the following system parameters:

Q=time step in Tq units=4

Tq=minimum step size=0.3125 ns

Ts=sample time=40 ns (sample clock 25 MHz)
Tp=pulse clock period=20.9375 ns (pulse clock 47.7612 MHz)
M=pulse clocks per pulse repetition=52
R=trace record length=(M*Np)/Q=871 points @ 1.25 ns spacing
Npr=number pulse repetitions=Ns/Q=32 per average
Acquisition Sequence:

To make an acquisition of data, a block of trace memory 42 (FIG. 2) of length R is allocated and initialized to zero. Pulse trigger signals are produced by a counter circuit that makes a pulse trigger every M pulse clock cycles. ADC readings are continuously produced at the sample clock rate. Starting with a predetermined pulse trigger position relative to the sample clock, ADC readings are summed into trace memory. This can be accomplished in two ways:

In the first way, sum ADC readings into R successive memory locations. In this version, memory locations are in order of real time acquisition, looping on this process for the number of desired averages. After acquisition is completed, the equivalent time trace is obtained by re-ordering the real time points as follows:

$$index_{equiv}(k) = \frac{\mod(k \times N_s, M \times N_p)}{Q}, \quad 0 \le k \le R-1$$

Note that mod(x, y) means x modulus y, meaning the remainder after division of x by y.

Example Continued:

Equivalent time index as a function of real time memory sequence, where k is relative memory address, is:

$$index_{equiv}(k) = \frac{\mod(k \times 128, 3{,}484)}{4}, \quad 0 \le k \le 871$$

The second way to accomplish the summing into trace memory is that the equivalent time index could alternately be calculated in real time as the data is being acquired to give the correct equivalent time address for each incoming ADC reading. This option may be available if the available processor to calculate is fast enough. In this case, the readings are summed into non-sequential locations according to the above equation, so that after acquisition the trace memory is properly ordered in equivalent time sequence.

Figure 3:
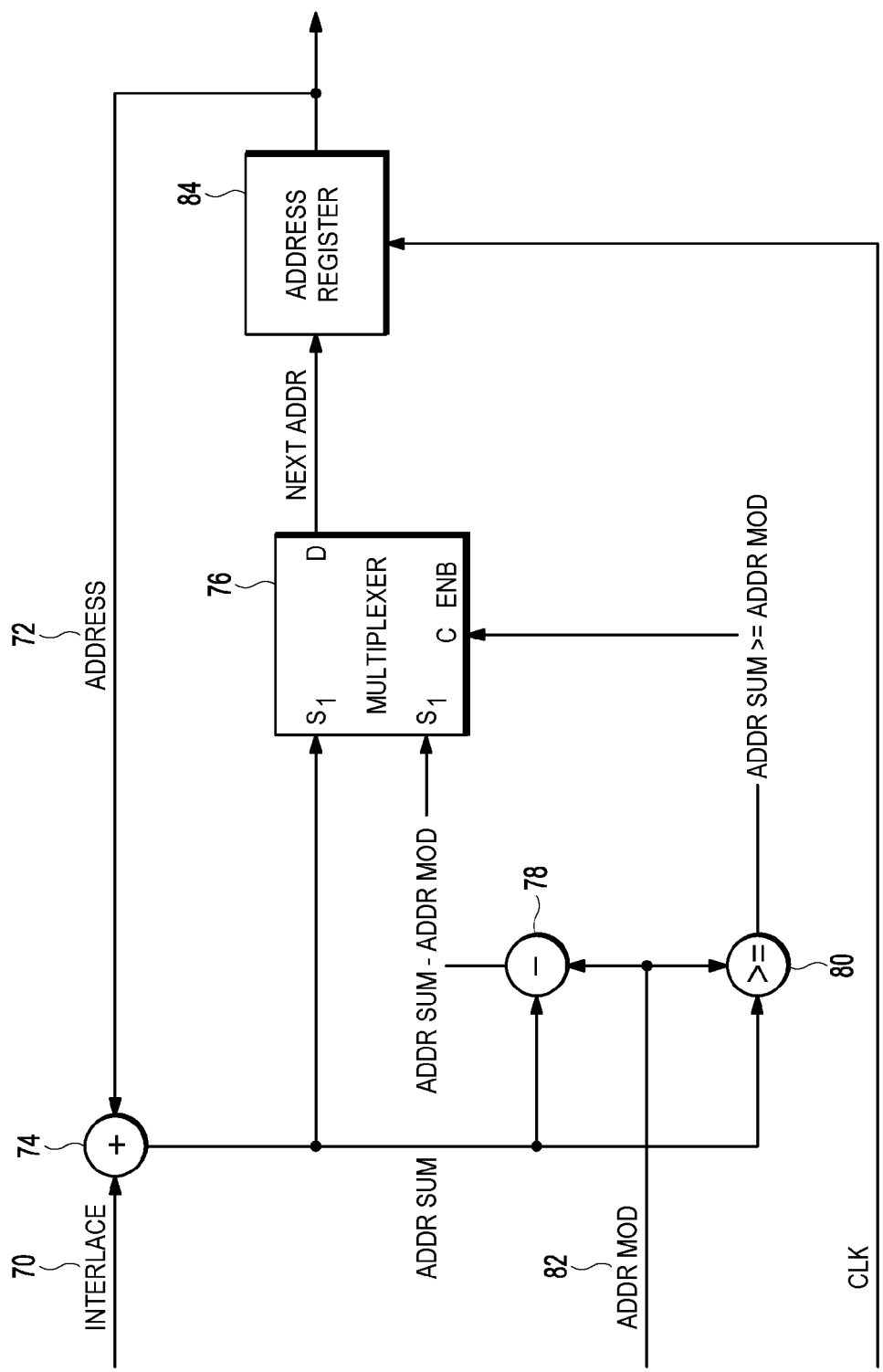
FIG. 3 is a diagram illustrating the address calculation employed in accordance with the present invention for storage of acquired equivalent time samples.

One way to accomplish this is illustrated in FIG. 3, a block diagram of an address calculation. An interlace value 70 and current address 72 are supplied to adder 74. The output of the adder is a first input to a multiplexer 76, to subtractor 78 and to greater or equal block 80. A second input to subtractor 78 and to greater or equal block 80 is AddrMod 82. The output of subtractor 78 is a second input to multiplexer 76, while the output of greater or equal block is supplied to the select line of the multiplexer. The output of the multiplexer, NextAddr, is the next address for storage, supplied to the address register 84. A clock signal provided to the address register determines when a new address is latched.

Interlace 70 is the ratio of the real time A/D rate to the equivalent time A/D rate. AddrMod 82 is calculated from the interlace valued and an actual trigger rate value. For interlace value of 1, Actual trigger rate=((requested trigger rate+128−1)/128)*128 and AddrMod 82=(actual trigger rate*interlace*67)/128

For interlace values of 2, 4, 8, 16, 32, 64 and 128, the computation is:

$$Mbias = 28/interlace$$

$$Mval = mbias*2$$

Actual trigger rate=(((requested trigger rate+mbias−1)/mval)*mval)+mbias

AddrMod=(actual trigger rate*interlace*67)/128

A particular embodiment of the invention employs a binary sequence of available step, ranging from 0.3125 to 40 ns:
Tq=minimum step size=0.3125 ns
Ts=sample time=40 ns (sample clock 25 MHz)
Tp=pulse clock period=20.9375 ns (pulse clock 47.7612 MHz)
Ns=128
Np=67

A table according to the relation:

$$\text{step size, ns} = T_q * gcd(M, N_s)$$

where gcd means 'greatest common divisor'

=0.3125*gcd(M,128)

| Step size, ns | M values for step size | | | | |
|---|---|---|---|---|---|
| .3125 | 1 | 3 | 5 | 7 | ... |
| .625 | 2 | 6 | 10 | 14 | ... |
| 1.25 | 4 | 12 | 20 | 28 | ... |
| 2.5 | 8 | 24 | 40 | 56 | ... |
| 5 | 16 | 48 | 80 | 112 | ... |
| 10 | 32 | 96 | 160 | 224 | ... |
| 20 | 64 | 192 | 320 | 448 | ... |
| 40 | 128 | 256 | 384 | 512 | ... |

Figure 4:
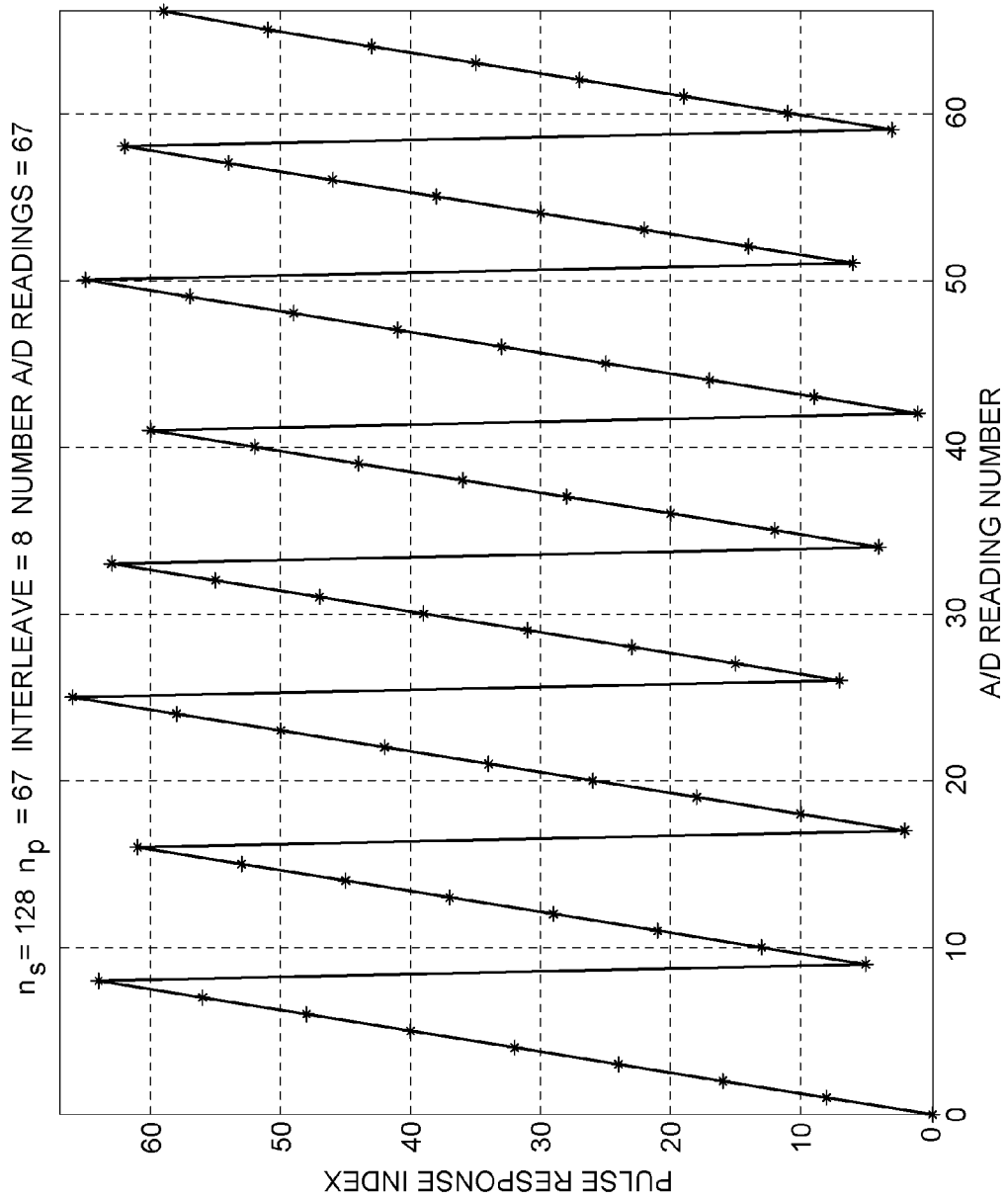
FIG. 4 is a graph showing an example of real time vs. equivalent time positions in memory of data.

FIG. 4 illustrates real time ADC reading number (x axis) vs. equivalent time index, for a system with 5.0 ns step size and M=16, for a pulse repetition period of 335 ns. Trace record length for this case is 67.

Figure 5:
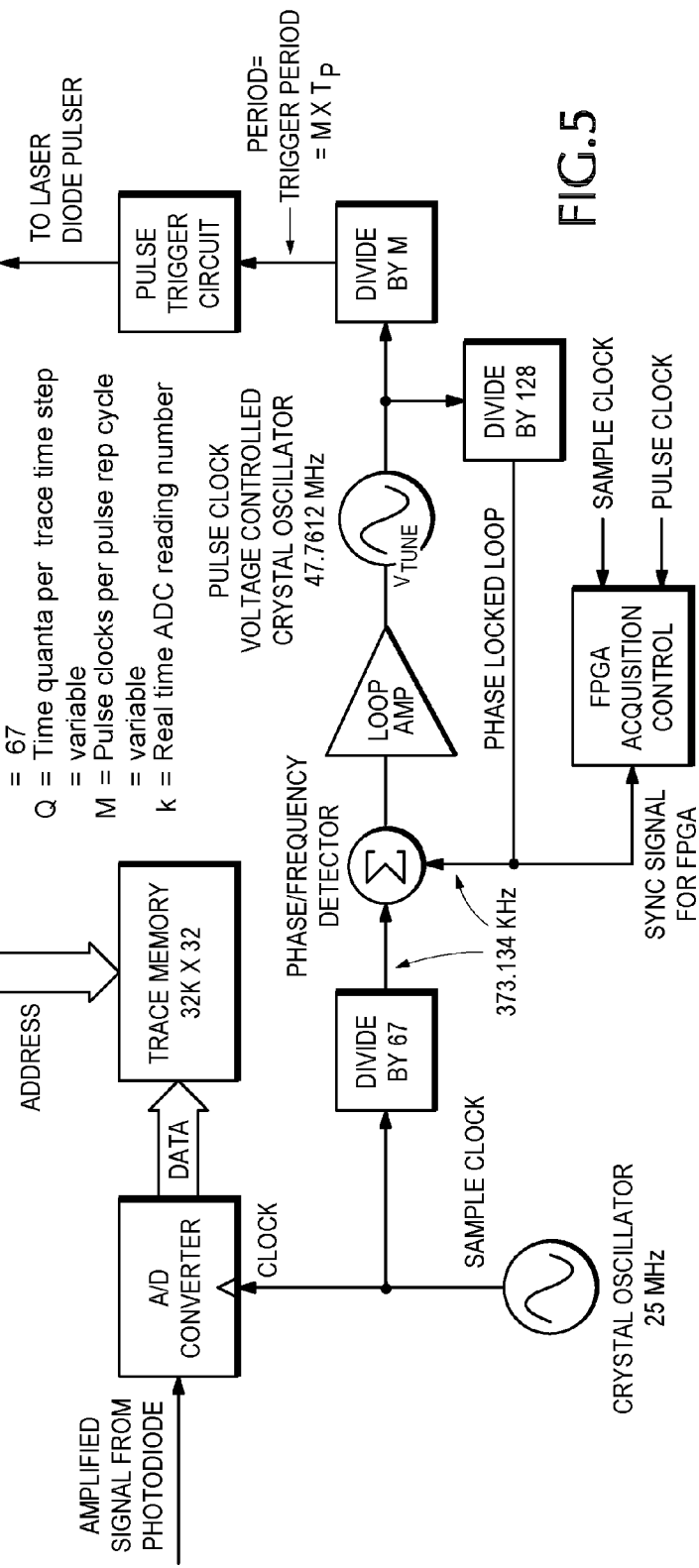
FIG. 5 is a diagram of a particular embodiment of the acquisition system.

FIG. 5 is a block diagram of an implementation of the system.

Accordingly, the above noted system advantageously provides that the laser trigger signal is digitally programmable in increments of 20.9375 ns in the particular embodiment. This allows pulse widths to be changed with software, rather than being fixed in a hardware implementation as in the prior art. Further, the phase locked loop employed to eliminate the analog laser trigger delay circuit is digital in nature and therefore exact, requiring no calibration as was necessary with the prior art.

Although the particular embodiment employs a binary sequence of time step sizes, arbitrary non-binary, finer spaced sets of time steps can be employed in accordance with the invention.

While the preferred embodiment is employed in an optical time domain reflectometer environment, the inventive concept is applicable to other uses. For example, the concepts could be used in a conventional (copper) time domain reflectometer, with the same advantages, or, for example, in radar systems, or other systems where the object is to obtain a time domain response to a periodic stimulus of a system under test, where it is desirable to vary the stimulus rate and the sampling intervals over a wide range.

While embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for equivalent time sampling, comprising the steps of:
    providing an allocation of sample storage memory;
    providing repetitive stimuli at a first clock rate;
    sampling response to the stimuli at a second clock rate;
    storing the sampled responses in the sample storage memory,
    wherein the first clock rate is determined by the following:
        selecting a minimum time step size Tq to be a value of the sample clock period divided by an integer N;
        selecting a pulse clock period to be an integer number of minimum time steps, wherein the pulse clock period and the sample clock period have no common divisors other than 1;
        selecting a pulse repetition period as an integer multiple M of pulse clock periods, to determine time step size, wherein time step size is the greatest common divisor of number of pulse clocks and sample clock period in step size units.

2. The method according to claim 1, wherein said step of storing the sampled responses in the sampled memory comprises determining an equivalent time position of a given sample and storing said sample at its respective equivalent time position in memory to provide an equivalent time ordered response set.

3. The method according to claim 1, wherein said step of storing the sampled responses in the sampled memory comprises storing the sampled response in a real sampling time relative position in memory; and
    reordering said samples to an equivalent time order after a desired set of samples has been obtained.

4. A method for equivalent time sampling, comprising the steps of:
    providing an allocation of sample storage memory;
    providing stimuli at a first clock rate;
    sampling response to the stimuli at a second clock rate;
    storing the sampled responses in the sample storage memory, wherein the first clock rate is determined by the following:
        selecting a minimum time step size Tq to be a value of the sample clock period divided by an integer N;
        selecting a pulse clock period to be an integer number of minimum time steps, wherein the pulse clock period and the sample clock period have no common divisors other than 1;
        selecting a pulse repetition period as an integer multiple M of pulse clock periods, to determine time step size, wherein time step size is the greatest common divisor of number of pulse clocks and sample clock period in step size units.

5. The method according to claim 4, wherein said step of storing the sampled responses in the sampled memory comprises determining an equivalent time position of a given sample and storing said sample at its respective equivalent time position in memory to provide an equivalent time ordered response set.

6. The method according to claim 4, wherein said step of storing the sampled responses in the sampled memory comprises storing the sampled response in a real sampling time relative position in memory; and
    reordering said samples to an equivalent time order after a desired set of samples has been obtained.

7. A method for equivalent time sampling, comprising the steps of:
    providing an allocation of sample storage memory;
    generating stimuli at a first clock rate and applying said stimuli to a system under test;
    sampling response of the system under test to the stimuli at a second clock rate:
    storing the sampled responses in the sample storage memory,
    wherein the first clock rate is determined by the following:
        selecting a minimum time step size Tq to be a value of the sample clock period divided by an integer N;
        selecting a pulse clock period to be an integer number of minimum time steps, wherein the pulse clock period and the sample clock period have no common divisors other than 1;
        selecting a pulse repetition period as an integer multiple M of pulse clock periods, to determine time step size, wherein time step size is the greatest common divisor of number of pulse clocks and sample clock period in step size units.
        selecting a pulse clock period to be an integer number of minimum time steps, wherein the pulse clock period and the sample clock period have no common divisors other than 1;
        selecting a pulse repetition period as an integer multiple M of pulse clock periods, to determine time step size, wherein time step size is the greatest common divisor of number of pulse clocks and sample clock period in step size units.

8. The method according to claim 7, wherein said step of storing the sampled responses in the sampled memory comprises determining an equivalent time position of a given sample and storing said sample at its respective equivalent time position in memory to provide an equivalent time ordered response set.

9. The method according to claim 7, wherein said step of storing the sampled responses in the sampled memory comprises storing the sampled response in a real sampling time relative position in memory; and
    reordering said samples to an equivalent time order after a desired set of samples has been obtained.

10. The method according to claim 7, wherein the generated stimuli is a repetitive stimuli.

* * * * *